(12) United States Patent
Yi

(10) Patent No.: US 10,841,790 B2
(45) Date of Patent: Nov. 17, 2020

(54) METHOD AND APPARATUS FOR SIGNALING UE CAPABILITY FOR NEW RADIO ACCESS TECHNOLOGY IN WIRELESS COMMUNICATION SYSTEM

(71) Applicant: LG ELECTRONICS INC., Seoul (KR)

(72) Inventor: Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1 day.

(21) Appl. No.: 16/315,611

(22) PCT Filed: Jul. 7, 2017

(86) PCT No.: PCT/KR2017/007323
§ 371 (c)(1),
(2) Date: Jan. 4, 2019

(87) PCT Pub. No.: WO2018/009037
PCT Pub. Date: Jan. 11, 2018

(65) Prior Publication Data
US 2019/0239066 A1  Aug. 1, 2019

Related U.S. Application Data

(60) Provisional application No. 62/359,691, filed on Jul. 7, 2016.

(51) Int. Cl.
*H04W 8/24* (2009.01)
*H04L 1/00* (2006.01)
(Continued)

(52) U.S. Cl.
CPC .............. *H04W 8/24* (2013.01); *H04L 1/0026* (2013.01); *H04L 1/1854* (2013.01);
(Continued)

(58) Field of Classification Search
CPC ... H04L 5/0055; H04L 1/0026; H04L 1/1854; H04L 1/1864; H04L 1/1887;
(Continued)

(56) References Cited

U.S. PATENT DOCUMENTS

| 2012/0207130 A1 | 8/2012 | Jang et al. |
| 2013/0242729 A1 | 9/2013 | Chen et al. |

(Continued)

FOREIGN PATENT DOCUMENTS

WO   2015108253   7/2015

OTHER PUBLICATIONS

PCT International Application No. PCT/KR2017/007323, International Search Report dated Oct. 17, 2017, 10 pages.
(Continued)

*Primary Examiner* — Awet Haile
(74) *Attorney, Agent, or Firm* — Lee, Hong, Degerman, Kang & Waimey

(57) ABSTRACT

A method and apparatus for transmitting a user equipment (UE) capability for new radio access technology (NR) in a wireless communication system is provided. A user equipment (UE) determines a UE category based on at least a transport block size (TBS) value and a transmission time interval (TTI), and transmits the UE capability including at least the TBS value and the TTI to a network.

14 Claims, 10 Drawing Sheets

(51) Int. Cl.
*H04L 5/00* (2006.01)
*H04L 1/18* (2006.01)
(52) U.S. Cl.
CPC .......... *H04L 1/1864* (2013.01); *H04L 1/1887* (2013.01); *H04L 1/1896* (2013.01); *H04L 5/0007* (2013.01); *H04L 5/0055* (2013.01); *H04L 5/0064* (2013.01); *H04L 5/0082* (2013.01); *H04L 5/0091* (2013.01)
(58) Field of Classification Search
CPC ... H04L 1/1896; H04L 5/0007; H04L 5/0064; H04L 5/0082; H04L 5/0091; H04W 8/24
See application file for complete search history.

(56) References Cited

U.S. PATENT DOCUMENTS

| | | | |
|---|---|---|---|
| 2013/0258965 A1 | 10/2013 | Geirhofer et al. | |
| 2014/0078919 A1* | 3/2014 | Hammarwall | H04L 1/0028 370/252 |
| 2016/0143002 A1* | 5/2016 | Lindoff | H04W 76/14 455/450 |
| 2017/0201968 A1* | 7/2017 | Nam | H04W 4/70 |
| 2019/0029003 A1* | 1/2019 | Takeda | H04W 72/04 |
| 2019/0053221 A1* | 2/2019 | Takahashi | H04L 1/0003 |

OTHER PUBLICATIONS

Samsung, "Framework for multiplexing verticals in NR", 3GPP TSG RAN WG1 Meeting #85, R1-164001, May 2016, 6 pages.

* cited by examiner

METHOD AND APPARATUS FOR SIGNALING UE CAPABILITY FOR NEW RADIO ACCESS TECHNOLOGY IN WIRELESS COMMUNICATION SYSTEM

CROSS-REFERENCE TO RELATED APPLICATIONS

This application is the National Stage filing under 35 U.S.C. 371 of International Application No. PCT/KR2017/007323, filed on Jul. 7, 2017, which claims the benefit of U.S. Provisional Application No. 62/359,691, filed on Jul. 7, 2016, the contents of which are all hereby incorporated by reference herein in their entirety.

BACKGROUND OF THE INVENTION

Field of the Invention

The present invention relates to wireless communications, and more particularly, to a method and apparatus for signaling a user equipment (UE) capability for a new radio access technology (NR) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (new RAT or NR) for convenience.

In NR, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating NR efficiently, various schemes have been discussed.

SUMMARY OF THE INVENTION

The present invention provides a method and apparatus for signaling a user equipment (UE) capability for a new radio access technology (NR) in a wireless communication system. This present invention discusses UE capability for NR, where different system bandwidth are considered in addition to variable UE bandwidth support capabilities.

In an aspect, a method for transmitting a user equipment (UE) capability by a UE in a wireless communication system is provided. The method includes determining a UE category based on at least a transport block size (TBS) value and a transmission time interval (TTI), and transmitting the UE capability including at least the TBS value and the TTI to a network.

In another aspect, a user equipment (UE) in a wireless communication system is provided. The UE includes a memory, a transceiver, and a processor, coupled to the memory and the transceiver, that determines a UE category based on at least a transport block size (TBS) value and a transmission time interval (TTI), and controls the transceiver to transmit a UE capability including at least the TBS value and the TTI to a network.

UE capability for NR can be signaled, thereby NR can be operated efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
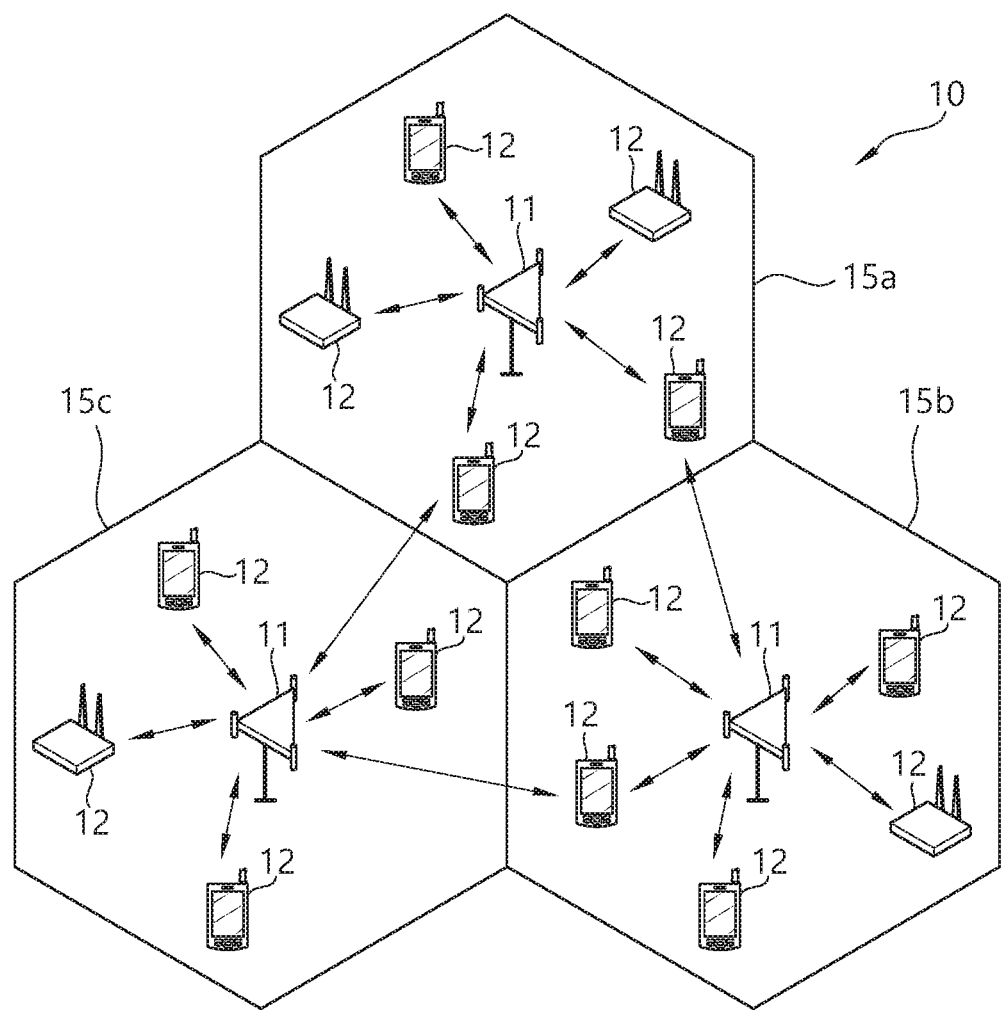
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
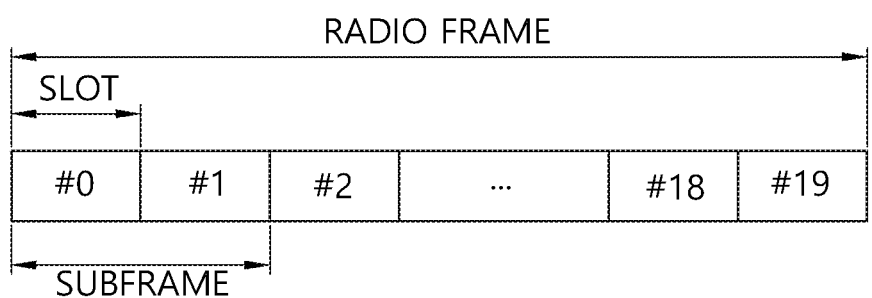
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

Figure 3:
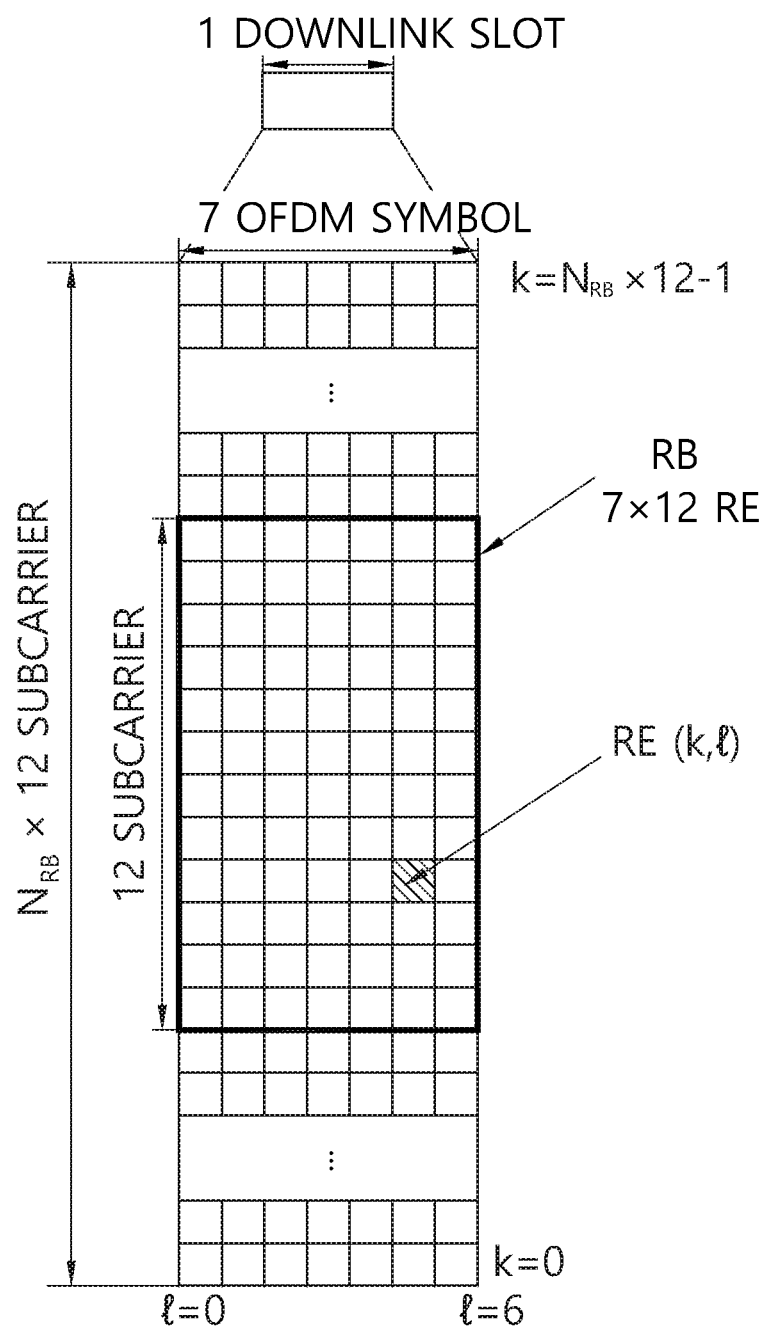
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-dvanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

It is expected that different frame structure may be necessary for NR. Particularly, different frame structure in which UL and DL may be present in every subframe or may change very frequently in the same carrier may be necessary for NR. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In NR, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in NR, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

Figure 4:
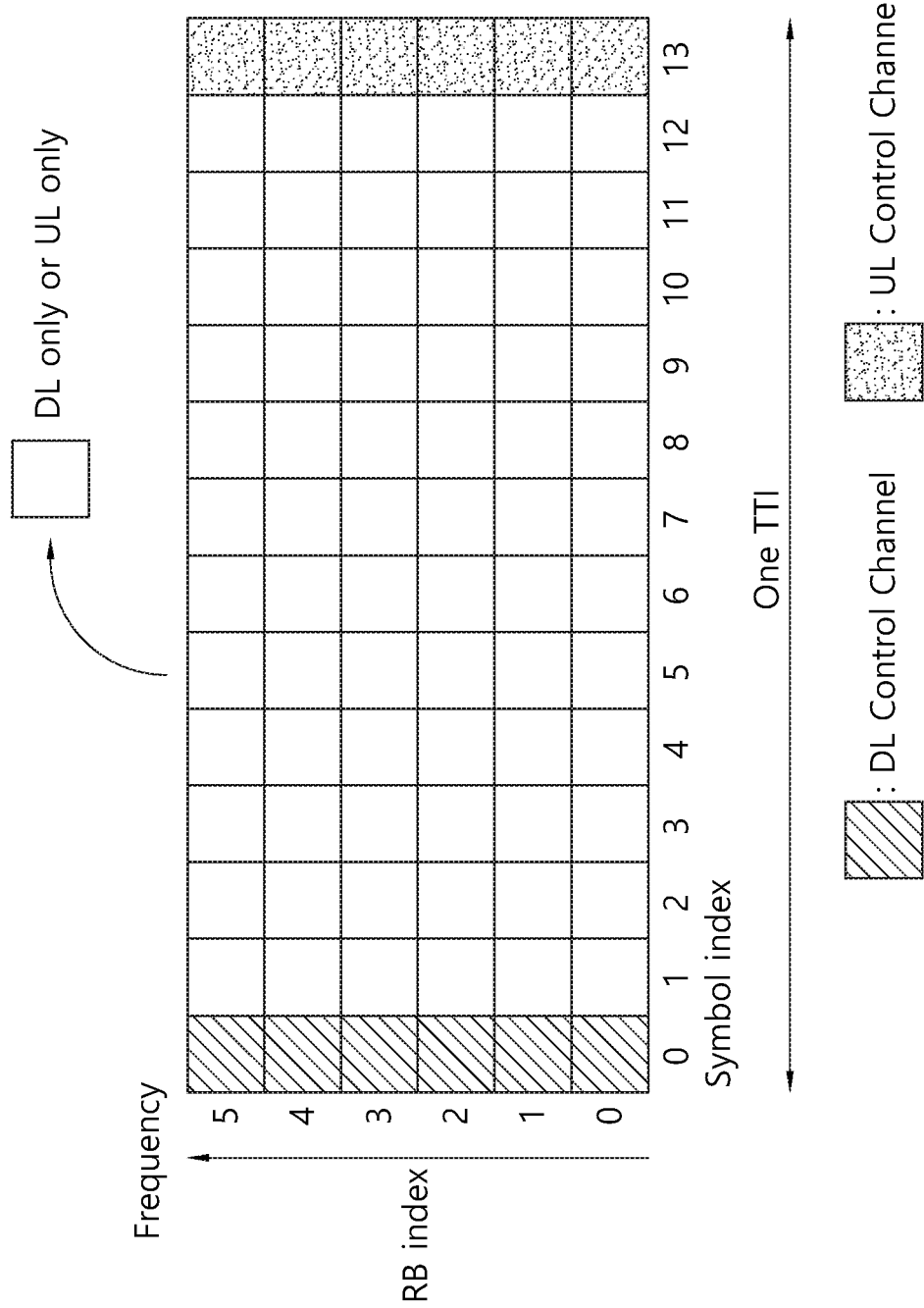
FIG. 4 shows an example of subframe type for NR.

FIG. 4 shows an example of subframe type for NR. The subframe shown in FIG. 4 may be used in TDD system of NR, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

In NR which supports various usage scenarios with different quality of service (QoS) requirements, more complicated UE capabilities/categories may be expected. For example, the length of TTI may vary due to different numerologies used in a frequency spectrum and/or for each usage scenario. Furthermore, the supported bandwidth by a UE may vary as well depending on UE baseband and/or radio frequency (RF) capabilities.

Meanwhile, in addition to "how much" aspects for capabilities (e.g. how much bandwidth the UE can support, how much data the UE can support, etc.), there are "how fast" aspects for capabilities, such as the decoding latency, channel state information (CSI) processing latency, timing to be ready for acknowledgement/non-acknowledgement (ACK/NACK) transmission for the corresponding physical downlink shared channel (PDSCH), timing to be ready for UL transmission after receiving UL grant, timing to be ready for physical random access channel (PRACH) (re)transmission, etc. In NR, "how fast" aspects for capabilities, as well as "how much" aspects for capabilities, should be handled. Furthermore, capabilities related to number of layers, cancellation capabilities, support of numerologies, combinations of possible numerologies and/or band, etc., may need to be handled as well. More specifically, there may be capabilities which are connected to each other. For example, decoding latency may be dependent on TTI length and/or numerology used for TTI/data transmission.

The present invention proposes mechanisms to indicate UE capabilities/categories to address various cases.

1. Default Numerology Based Approach

In order to indicate UE capability for NR, first approach is to take similar approach to LTE capability and category signaling. To utilize a similar frame structure, capabilities/categories defined by default numerology may be used. For example, regardless of whether a UE supports the default numerology or not, the UE may indicate the capabilities/categories assuming the default numerology. Default numerology may correspond 15 kHz subcarrier spacing, then similar approach to LTE capabilities/categories may be used. When this approach is used, capabilities for other cases, such as shorter TTI than the default TTI provided by default numerology and/or different numerology, may be implicitly determined according to a function. A UE may indicate which additional capabilities are supported by the UE. As it is expected that different numerologies may be used in frequency spectrum below 6 GHz and above 6 GHz frequency spectrum, the default numerology may be different in below 6 GHz and above 6 GHz frequency spectrum.

As it becomes challenging to test the UE category if a UE does not support the default numerology, it may also be considerable to mandate for UEs to support the default numerology per each UE category. The default numerology may be different per UE category. Table 1 shows an example of UE category for NR based on this alternative. Table 1 also shows DL physical layer parameter values set by the field ue-Category.

In other words, any pair of TBS value and processing time in the supported region may be supported by the UE. In addition to this processing, a UE may indicate the supported

TABLE 1

| UE Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL | Supported default numerology | Supported usage scenarios (optional) |
| --- | --- | --- | --- | --- | --- | --- |
| Category 1 | 301504 | 224664 (4 layers, 256QAM) 112332 (2 layers, 256QAM) | 5481216 | 2 or 4 | 15 kHz | eMBB |
| Category 2 | 10296 | 10296 | 250368 | 1 | 60 kHz | URLLC |
| Category 3 (Cat 1 + Cat 3) (Note 2) | 301504 with 15 kHz or 10296 with 60 kHz | 224664 (4 layers, 256QAM) 112332 (2 layers, 256QAM) | 5481216 | 2 or 4 | 15/60 kHz | eMBB or URLLC |

(Note 1):
TTI length can be different depending on the default numerology. The system bandwidth can be assumed to be different as well depending on the default numerology
(Note 2):
A UE supporting both eMBB and URLLC simultaneously can indicate different category per each usage scenario (e.g., Cat 1 and Cat 2). If the UE can support both in a TDM manner (i.e., not simultaneously), a new UE category can be considered.

If this approach is used, based on default numerology, UE minimum processing time and the associated number of HARQ processes may be determined. If the UE can support lower latency than the processing time defined based on default numerology, additional capability signaling may be supported.

Further, based on maximum fast Fourier transform (FFT) size that a UE can support and the default numerology, the maximum system bandwidth may also be defined. For example, with 1024 FFT size for 15 kHz subcarrier spacing, maximum system bandwidth of 20 MHz may be assumed. And with 60 kHz subcarrier spacing, maximum system bandwidth of 80 MHz may be assumed. The maximum bandwidth assumed with a default numerology may be different depending on the necessity of guard band, etc.

For a UE supporting different usage scenario in a time division multiplexing (TDM) manner (but not at the same time), the UE may indicate categories for different usage scenarios respectively, and may indicate whether the can support different usage scenarios simultaneously or in a TDM manner via additional capability signaling.

When this approach is used, the minimum processing time may be defined in a function of TTI (TTI may change by a form of mini-slot, i.e. less OFDM symbols in a scheduling unit or by a form of different numerology), which may be signaled separately or predefined. In other words, overall capability may be reported based on the default numerology. However, depending on the supported UE numerology and processing time, the UE may support higher data rate and/or higher soft buffer size. Alternatively, if a UE does not signal any other value, a default value of the minimum processing time may be defined. If a UE may have lower processing time and/or higher processing time, a separate signaling may be used.

For cases with different TTIs and/or different numerologies, the following approaches may be considered.

Figure 5:
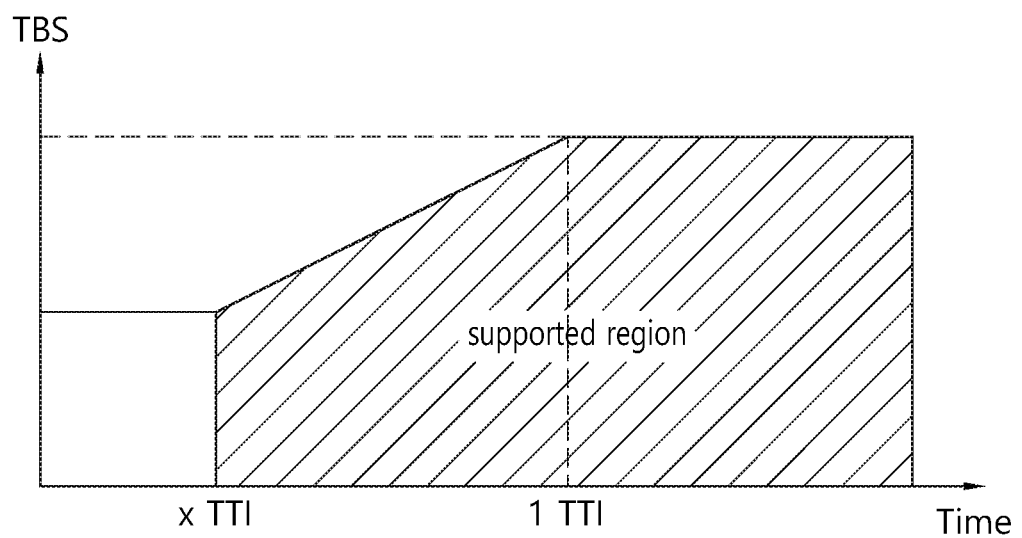
FIG. 5 shows an example of UE capability for different TTIs according to an embodiment of the present invention.

FIG. 5 shows an example of UE capability for different TTIs according to an embodiment of the present invention. In this embodiment, with shorter TTI, linearly scaled down transport block size (TBS) may be supported up to the minimum of maximum TBS which requires xTTI processing/decoding time. The xTTI may be predefined per UE category (or usage scenario, a common value for all UEs, etc.) or indicated by a UE.

set of numerologies which may or may not be mapped to the shorter TTI length. Also, if a UE supports shorter TTI with the default numerology, the capability of supporting shorter TTI may also be indicated.

In addition to processing time for data, CSI processing time may be indicated separately, which may indicate absolute time of processing (i.e. independent on TTI length and/or numerology).

The capability may be derived based on the assumption that the same TTI length is used for data transmission. In other words, TTI length may not be dynamically changed. If dynamic TTI length is considered, it is possible that preceding long TTI transmission may delay the processing of succeeding short TTI transmission, unless some preemption and/or decoding capability sharing between different TTIs is considered. In terms of capability, it may be assumed that the same size of TTI is used throughout the data transmission. Whether a UE can perform preemption and/or decoding capability sharing between different TTIs may be additionally signaled as one of UE capability.

Figure 6:
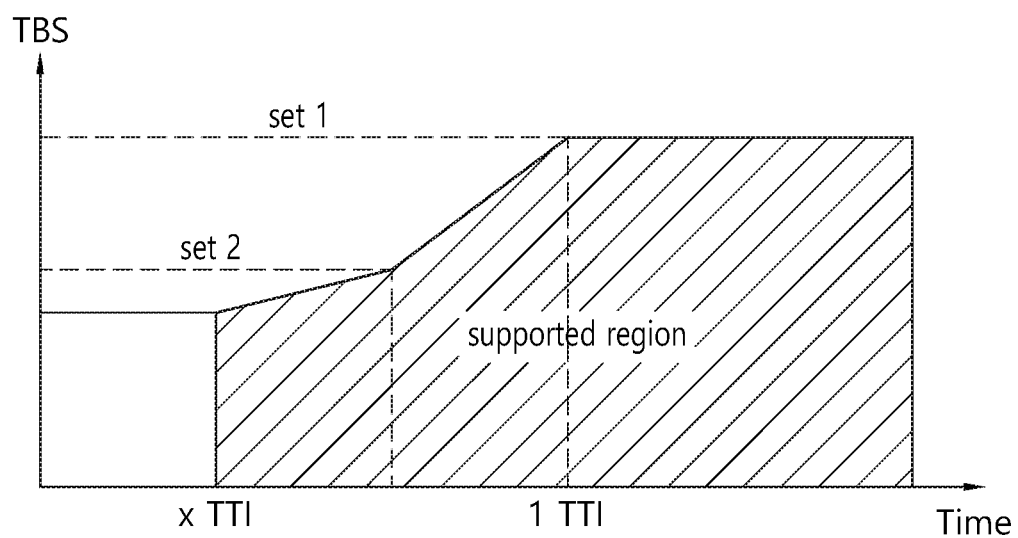
FIG. 6 shows another example of UE capability for different TTIs according to an embodiment of the present invention.

FIG. 6 shows another example of UE capability for different TTIs according to an embodiment of the present invention. In this embodiment, the processing latency is not linearly scaled down with maximum TBS reduction. Therefore, multiple set of {TBS, processing time, (and optionally soft buffer size)} or {max TBS, xTTI, (and optionally soft buffer size)} may be indicated. A UE may indicate multiple set of {TBS, processing time}. The processing time may be linearly scaled down between of signaled values. When multiple sets of UE capabilities are supported, the UE may report the maximum capability as its UE category. In other words, based on the minimum processing time and/or largest data rate, the UE may report its UE category. In general, lower processing time may lead higher data rate. In this sense, if this approach is used, based on the minimum processing time based on a numerology, the UE may report its category.

Figure 7:
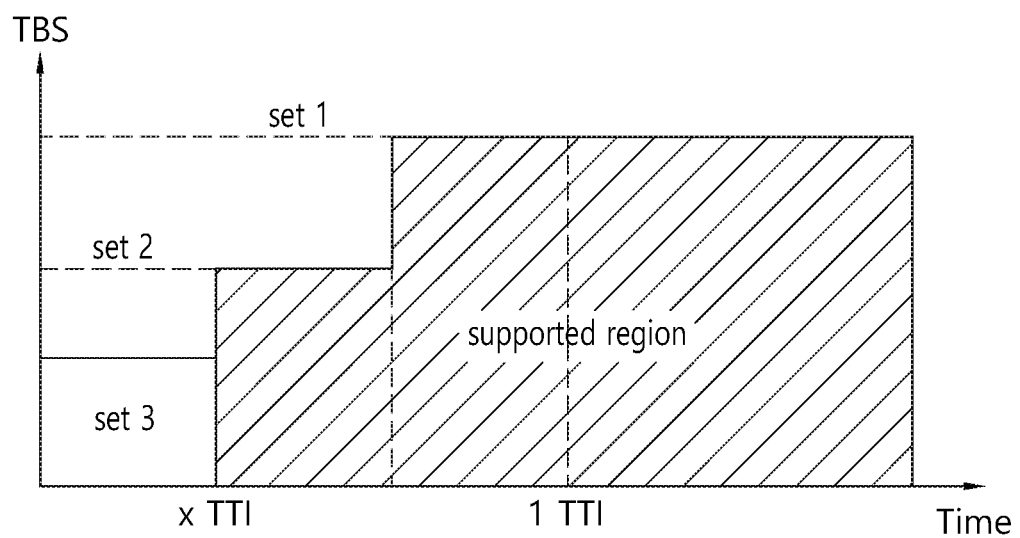
FIG. 7 shows another example of UE capability for different TTIs according to an embodiment of the present invention.

FIG. 7 shows another example of UE capability for different TTIs according to an embodiment of the present invention. In this embodiment, multiple set of {TBS, processing time} may be provided, but instead of linearly scaling down between signaled values, the processing time for a TBS Y may be the smallest value among the indicated values, and the corresponding TBS size may be larger than Y.

2. Separate Signaling Per Numerology

The second approach is to indicate maximum TBS based on each supported numerology separately. With a numerology, multiple set of TBS, processing time may also be indicated.

Hereinafter, based on minimum processing time which may be indicated by a UE category/capability signaling, HARQ-ACK round trip time (RTT) and other associated optionally soft buffer size)} for the mini-subframe and subframe based TTI based on the default numerology. Default numerology may be 15 kHz subcarrier spacing for below 6 GHz frequency spectrum and 60 kHz subcarrier spacing for above 6 GHz frequency spectrum. Between two values, linear scaling may be supported.

Table 2 shows an example of extension of Category 1 shown in Table 1. In Table 2, separate indication may be given based on the supported numerology.

TABLE 2

| UE Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL | Supported default numerology | Supported usage scenarios (optional) |
|---|---|---|---|---|---|---|
| Category 1 | {301504, 14OS} {43072, 2OS} | {224664, 14OS} (4 layers, 256QAM) (112332, 14OS) (2 layers, 256QAM) {32095, 2OS} (4 layers, 256QAM) {16048, 2OS} (2 layers, 256QAM) | 5481216 5481216 | 2 or 4 | 15 kHz | eMBB |
| | {75376, 14OS} {37688, 7OS} | {56166, 14OS} (4 layers, 256QAM) (28083, 14OS) (2 layers, 256QAM) *85{28083, 7OS} (4 layers, 256QAM) {14042, 7OS} (2 layers, 256QAM) | | 2 or 4 | 60 kHz | eMBB/ URLLC |

(Note 1):
TTI length can be different depending on the default numerology. The system bandwidth can be assumed to be different as well depending on the default numerology timing determination is discussed below. Minimum HARQ-ACK RTT time for ACK/NACK may be defined by Equation 1. Based on minimum RTT, number of HARQ processes and the needed soft buffer size may be defined.

xTTI for data decoding+ACK/NACK encoding latency (e.g. 1TTI with the minimum TTI that a UE can support based on the UE capability)+ maximum TA (configurable to a UE in a given configuration)     <Equation 1>

For example, if xTTI=1 TTI, and a UE can support 0.5*TTI ACK/NACK encoding latency with no more than 0.5*TTI timing advance (TA), the minimum HARQ-ACK RTT may be 2*TTI. Then, ACK/NACK may be transmitted at n+3 subframe, assuming data transmission ends at subframe n. If ACK/NACK encoding latency takes longer than 1*TTI with the minimum TTI, a UE needs to indicate its capability separately. For common channels such as random access response (RAR), the capability may be based on default numerology used for initial access. For contention free access, the timing may be determined by UE capability. In other words, if the network knows the capability of a UE (and also knows that the intended UE's identity), the timing may be based on the UE capability. Otherwise, the timing may be determined based on the numerology/TTI configured to the resource/procedure. For example, short TTI may be used in the initial access procedure by defining different TTI, e.g. based on reducing the number of OFDM symbols or increasing subcarrier spacing. The resource may be selected by a UE which may also support the configured TTI/numerology configurations.

In terms of UE capability with different TTI length, one example is to indicate two pairs of {TBS, TTI length, (and The minimum ACK/NACK preparation/encoding latency may be the smallest TTI length supported by the UE based on UE category along with the supported numerology. If the UE supports, e.g. mini-subframe with 60 kHz, the ACK/NACK preparation time may be mini-subframe length with 60 kHz subcarrier spacing (e.g. 0.125 ms assuming mini-subframe with 60 kHz subcarrier spacing is 7 OS).

Based on the UE processing time, various ACK/NACK timing may be defined. The ACK/NACK timing may be categorized into two category, (1) within a subframe and (2) across multi-subframe. In terms of ACK/NACK timing indication, at least one of the following approaches may be considered.

Whether the timing is within a subframe or across subframe may be indicated by 1 bit. Then, offset may be further indicated. If it is within a subframe, the offset may be applied over OFDM symbols. If it is across the multi-subframe, the offset may be applied over subframes.

Regardless of timing, offset may be always be applied per OFDM symbol level. For multiple subframes, multiple OFDM symbols may be used.

Regardless of timing, offset may always be applied per subframe. If offset is 0, it means self-contained ACK/NACK or PUSCH transmission, which will require the UE to transmit ACK/NACK or PUSCH in the same subframe. In a subframe, the position of ACK/NACK transmission may not be explicitly indicated. However, implicit indication via explicit gap in the end of subframe or based on scheduling may be considered.

Depend on TBS (e.g. if TBS>threshold, then ACK/NACK timing is assumed to be across multi-subframe. Otherwise, ACK/NACK timing may be assumed to be across OFDM symbols), the offset may be applied differently.

Depending on number of OFDM symbols used for data transmission (e.g. number of OFDM symbols based on default numerology is larger than Z, then ACK/NACK timing is assumed to be across multi-subframe. Otherwise, ACK/NACK timing may be assumed to be applied across OFDM symbols), the offset may be applied differently.

ACK/NACK timing may be determined implicitly based on TBS and the ending position of data transmission, and different offset depending on whether a UE can transmit ACK/NACK within a subframe or across multi-subframe may be applied. For example, if TBS-1 is the maximum TBS supported by a mini-subframe, and if a UE is scheduled with 3*TBS-1, then the ACK/NACK timing may correspond to 3*mini-subframe. If data transmission time+3*mini-subframe+mini-subframe (ACK/NACK encoding time)+max TA configurable is less than 1 subframe, a UE may assume that ACK/NACK is to be transmitted within a subframe. Otherwise, a UE may assume that ACK/NNACK is expected to be transmitted in the next or in a few subframes.

The above mechanism is based on the assumption that a UE is not configured with mini-subframe operation. If mini-subframe is configured, ACK/NACK transmission may applied based on mini-subframe. In other words, offset may be applied based on number of mini-subframe. However, the similar approaches may be applied even with mini-subframe operation configured.

If a UE cannot process the requested ACK/NACK transmission timing, it is up to UE implementation whether to transmit ACK/NACK (which may be NACK) or skip ACK/NACK transmission.

Figure 8:
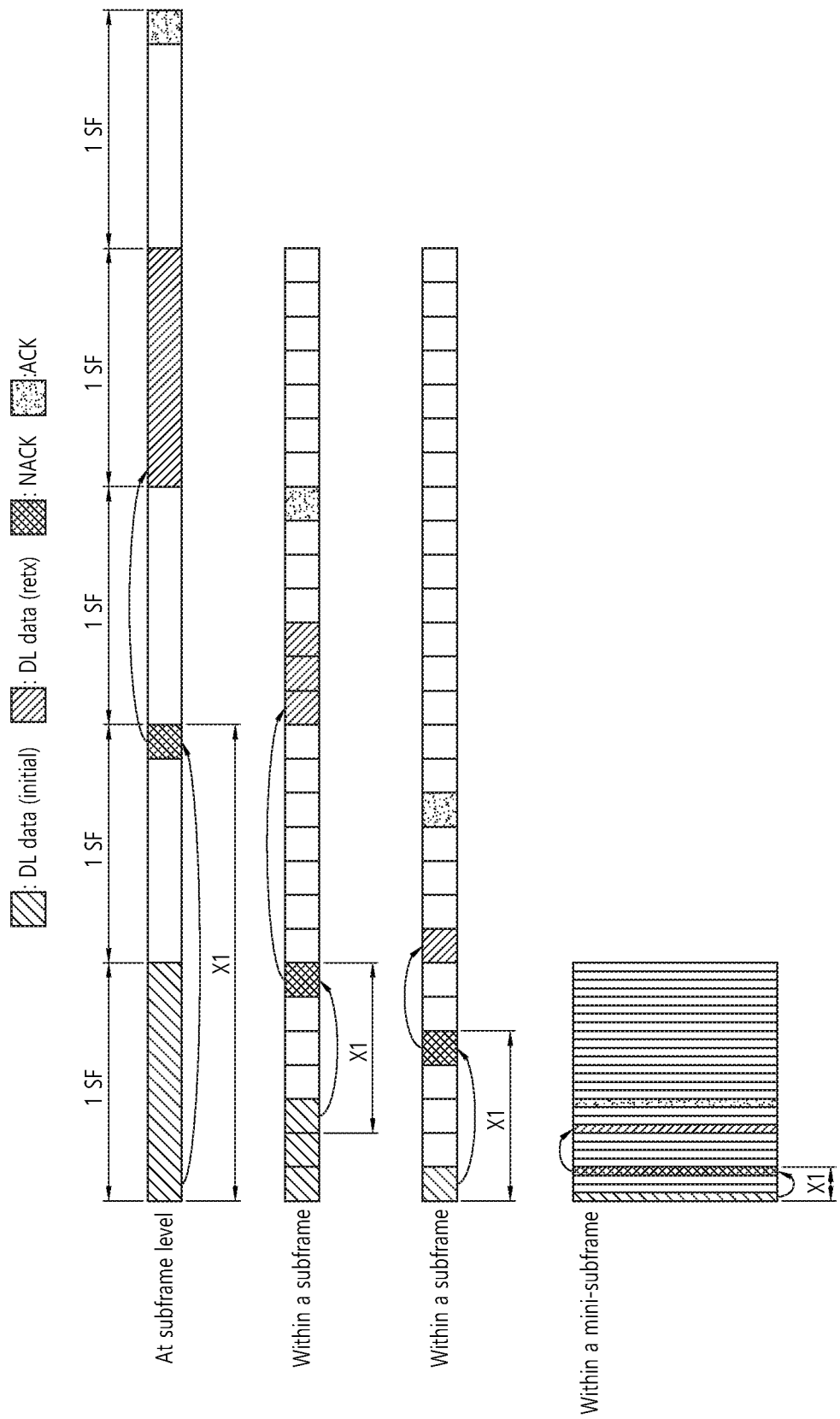
FIG. 8 shows an example of ACK/NACK timing according to an embodiment of the present invention.

FIG. 8 shows an example of ACK/NACK timing according to an embodiment of the present invention. In this embodiment, X1=offset used for ACK/NACK transmission may be different from each other, depending on cases based on one or a few approaches mentioned above. One example of self-contained ACK/NACKN transmission is to allow a UE capability based on mini-subframe (regardless of whether a UE supports mini-subframe operation or not). In the first figure of FIG. 8, if TBS-1 is the supported TBS with mini-subframe duration, the processing time may be linearly scaled up with the TBS increase from TBS-1. In the second figure of FIG. 8, TBS-1 is scheduled over about 3*mini-subframes, which then would require for ACK/NACK timing as 1*mini-subframe for data decoding+1*mini-subframe for ACK/NACK encoding and 1*mini-subframe for maximum TA. Then, ACK/NACK may be transmitted in the last part of the subframe. In the third figure of FIG. 8, the data transmission ends 2*mini-subframes earlier than the second figure of FIG. 8. In this case, ACK/NACK may be transmitted earlier than end of subframe. The offset X may be applied at OFDM symbol level (or mini-subframe level). In the fourth figure of FIG. 8, X1 may be further applied at OFDM symbol level within a mini-subframe if applied.

To minimize the required values of offset, the offset may be added to minimum ACK/NACK transmission processing time, which may be UE-specific and may be signaled by UE. For example, X1 mentioned above in FIG. 8 may be zero, as all cases are requested to transmit ACK/NACK with minimum processing time.

Furthermore, similar approach may be applied for PUSCH encoding time.

Alternatively, minimum gap for ACK/NACK preparation gap may be indicated assuming TA=0 which then includes data decoding latency+ACK/NACK encoding latency for ACK/NACK transmission, control decoding latency+PUSCH encoding latency for UL transmission. Multiple values of minimum gap with TBS may be indicated. If single value is indicated, linear scaling may be assumed with TBS. The gap value may be absolute value rather than based on TTI, so that actual the number of TTI required for data decoding may be different based on subframe/mini-subframe with the configured numerology. For example, minimum gap of TBS-A may be 1.25 ms, which may correspond to 5 subframes with 60 kHz subcarrier spacing and 3 subframes with 30 kHz subcarrier spacing and 2 subframes with 15 kHz subcarrier spacing. If minimum gap of TBS-B is 0.3 msec, which may correspond to 1 subframe with 60 kHz subcarrier spacing, 2 subframes with 30 kHz subcarrier spacing and 1 subframe with 15 kHz subcarrier spacing, and 2 mini-subframes with 15 kHz subcarrier spacing (assuming mini-subframe consists of 2 OFDM symbols).

Furthermore, number of layers, the number of CSI reporting, etc., may be separately indicated rather than associated with UE category.

Figure 9:
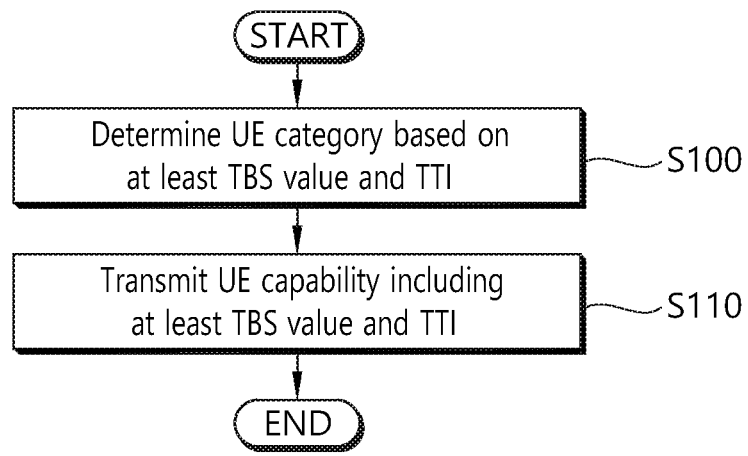
FIG. 9 shows a method for transmitting a UE capability by a UE according to an embodiment of the present invention.

FIG. 9 shows a method for transmitting a UE capability by a UE according to an embodiment of the present invention. The present invention described above may be applied to this embodiment.

In step S100, the UE determines a UE category based on at least a TBS value and a TTI. In step S110, the UE transmits the UE capability including at least the TBS value and the TTI to a network.

The UE category and the UE capability may be based on a default numerology. The default numerology may be different in below 6 GHz frequency spectrum and above 6 GHz frequency spectrum. The UE category may be based on a numerology corresponding to a smallest processing time, and the UE capability may be based on each numerology supported by the UE.

The UE may support a TBS from a first TBS, which is indicated by the TBS value, to a second TBS, which is a maximum TBS requiring a minimum processing time, by linearly scaling down. The minimum processing time may be defined by a function of TTI or numerology. The minimum processing time may be transmitted to the network in the UE capability or predefined. The minimum processing time may be defined per UE category or usage scenario.

The UE capability may be defined for each of different usage scenarios. The UE capability may indicate supported set of numerologies. The UE capability may indicate supporting of shorter TTI. The UE capability may indicate CSI processing time.

The combination of the TTI value and the TTI may correspond to a data rate. The data rate may correspond to ACK/NACK timing.

Figure 10:
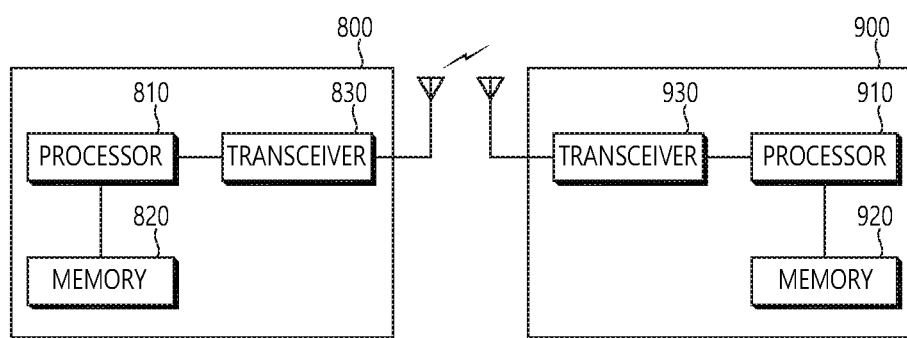
FIG. 10 shows a wireless communication system to implement an embodiment of the present invention.

FIG. 10 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for transmitting a user equipment (UE) capability by a UE in a wireless communication system, the method comprising:
   determining a UE category based on at least a transport block size (TBS) value and a transmission time interval (TTI); and
   transmitting the UE capability including at least the TBS value and the TTI to a network,
   wherein the UE supports a TBS from a first TBS, which is indicated by the TBS value, to a second TBS, which is a maximum TBS requiring a minimum processing time, by linearly scaling down.

2. The method of claim 1, wherein the UE category and the UE capability are based on a default numerology.

3. The method of claim 2, wherein the default numerology is different in below 6 GHz frequency spectrum and above 6 GHz frequency spectrum.

4. The method of claim 2, wherein the default numerology is different per UE category.

5. The method of claim 1, wherein the UE category is based on a numerology corresponding to a smallest processing time, and
   wherein the UE capability is based on each numerology supported by the UE.

6. The method of claim 1, wherein the minimum processing time is defined by a function of TTI or numerology.

7. The method of claim 1, wherein the minimum processing time is transmitted to the network in the UE capability or predefined.

8. The method of claim 1, wherein the minimum processing time is defined per UE category or usage scenario.

9. The method of claim 1, wherein the UE capability indicates supported set of numerologies.

10. The method of claim 1, wherein the UE capability indicates supporting of shorter TTI.

11. The method of claim 1, wherein the UE capability indicates channel state information (CSI) processing time.

12. The method of claim 1, wherein a combination of the TBS value and the TTI corresponds to a data rate.

13. The method of claim 12, wherein the data rate corresponds to acknowledgement/non-acknowledgement (ACK/NACK) timing.

14. A user equipment (UE) in a wireless communication system, the UE comprising:
    a memory;
    a transceiver; and
    at least one processor, operatively coupled to the memory and the transceiver, and configured to:
    determine a UE category based on at least a transport block size (TBS) value and a transmission time interval (TTI), and
    control the transceiver to transmit a UE capability including at least the TBS value and the TTI to a network,
    wherein the UE supports a TBS from a first TBS, which is indicated by the TBS value, to a second TBS, which is a maximum TBS requiring a minimum processing time, by linearly scaling down.

* * * * *